United States Patent [19]

Smith et al.

[11] 4,028,139
[45] June 7, 1977

[54] METHODS AND MULTIPLE THERMOCOUPLE SUPPORT ASSEMBLY

[75] Inventors: Randlow Smith; Henry B. Jones; Adrianus C. Jobsis; Hugh C. Deloney, all of Houston, Tex.

[73] Assignee: Texaco Inc., New York, N.Y.

[22] Filed: Dec. 4, 1975

[21] Appl. No.: 637,787

[52] U.S. Cl. .................................. 136/230; 73/341
[51] Int. Cl.² ......................................... H01L 35/02
[58] Field of Search ............. 136/230; 73/341, 340, 73/342

[56] References Cited

UNITED STATES PATENTS

| | | | |
|---|---|---|---|
| 2,816,442 | 12/1957 | Burton | 73/340 |
| 3,955,419 | 5/1976 | Barton et al. | 73/341 |

*Primary Examiner*—T.H. Tubbesing
*Assistant Examiner*—Richard E. Berger

*Attorney, Agent, or Firm*—Carl G. Ries; Thomas H. Whaley; Theron H. Nichols

[57] ABSTRACT

Various methods and a multiple thermocouple support assembly are disclosed. The support comprises a tube supported at both ends while extending across a vessel used in processing a fluid over a fixed bed of particulate solids, for example, such as a hydrotreating catalyst in fixed bed reactors, in which temperature measurements are required simultaneously at various defined locations in a horizontal plane across the bed. Features of the support include a particular means for mounting thermocouples in thermowells and particular means for securing the thermowells to the support tube, the thermocouples being pressed against the outer wall of each thermowell opposite to the support tube and the thermowells being spaced from each other and from the support tube for obtaining maximum heat conduction from the fluid or fixed bed of particulate solids with a minimum of heat conduction from the thermowell support tube.

17 Claims, 5 Drawing Figures

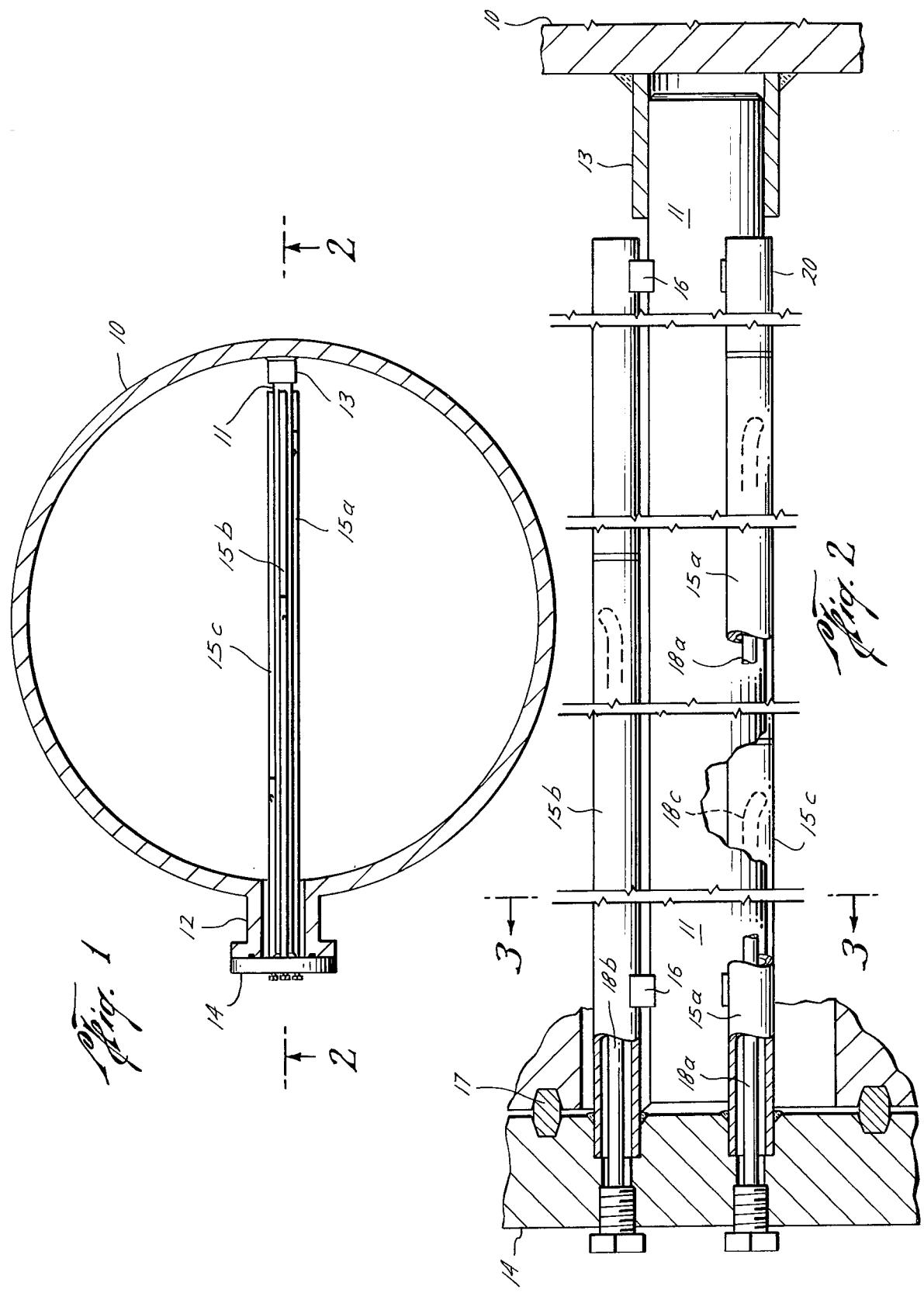

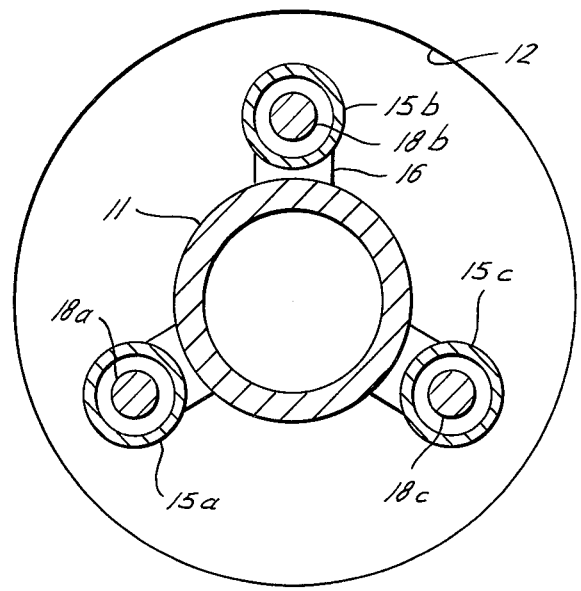
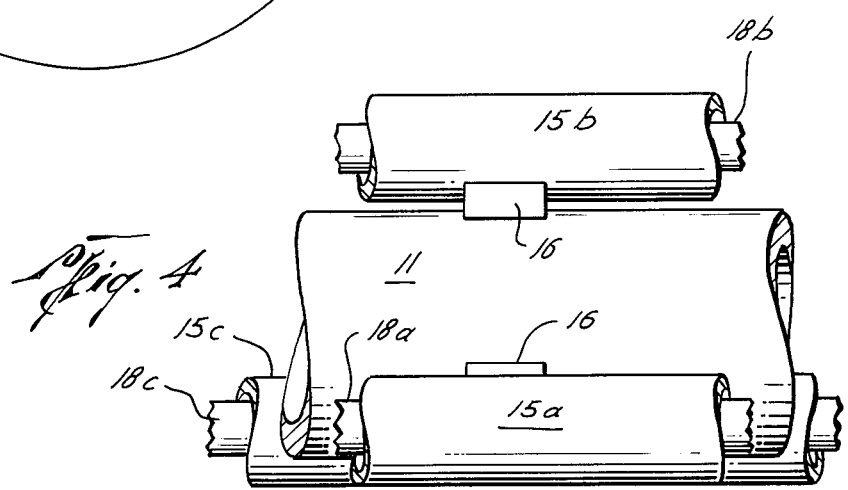
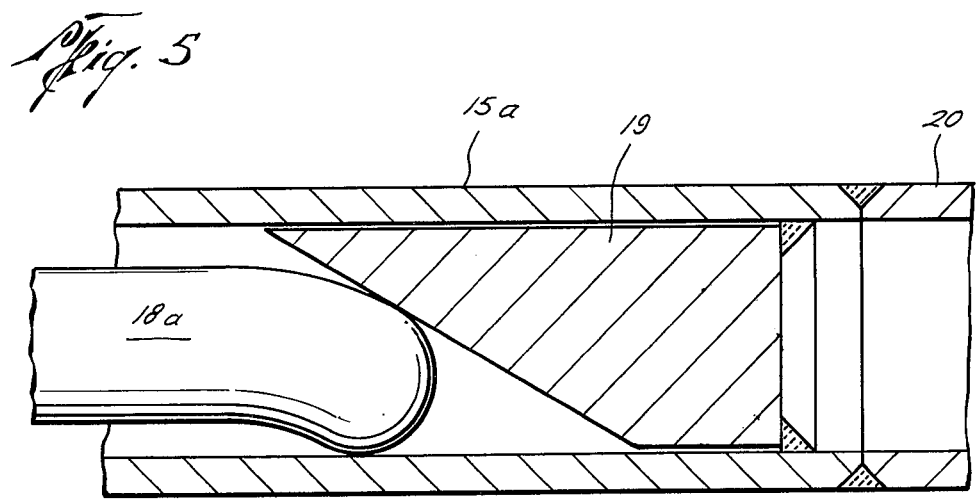

METHODS AND MULTIPLE THERMOCOUPLE SUPPORT ASSEMBLY

BACKGROUND OF THE INVENTION

Monitoring operations and regeneration of granular beds in reactors, sieve cases, etc., require positioning of thermocouples at various locations in plane and elevation. Reactor and bed arrangements frequently require thermocouple wells to be inserted horizontally through the wall of a vertical vessel and multiple wells are frequently used for checking temperatures at defined locations on a horizontal plane across the bed. Long wells are likely to be bent, due to catalyst settlement or dumping, so that they cannot be easily withdrawn for inspection or repair and their actual location may be in question.

Various devices have been utilized but none are adequate for measuring a plurality of temperatures of a vessel of fluid simultaneously in a plurality of precise locations in substantially a horizontal plane. U.S. Pat. 2,350,976 (Class 257, Subclass 262) has heat conducting fins along the tube and not at precise points or locations as set forth in the following disclosure. U.S. Pat. No. 3,399,570 (73-399) discloses a single temperature measuring device for measuring only one temperature across an enclosed space instead of measuring a plurality of temperatures at a plurality of precise locations in a horizontal plane simultaneously. U.S. Pat. No. 3,487,689 (73-399) likewise only shows one thermometer supported for variable positioning. U.S. Pat. No. 3,518,883 (73-359) discloses means for measuring fluid at two locations in a vessel or vessels of fluid, but no means is provided for supporting and protecting the heat sensing devices in the fluid from damage. U.S. Pat. No. 3,534,609 (73-339) likewise only measures the average temperature in a furnace instead of several precise different temperatures utilizing a single steel or alloy tube extended across the space to be measured.

Thus the following objects of measuring various precise temperatures are desired and are found in the disclosed invention.

OBJECTS OF THE INVENTION

A primary object of this invention is to provide a method for forming a multiple thermocouple assembly for a vessel containing a fixed bed of particulate solids for measuring various fluid temperatures simultaneously in different precise locations in a substantially horizontal section through the fixed bed in the vessel while withstanding vertical forces resulting from settlement of the beds and/or dumping of the beds.

Another primary object of this invention is to provide a method for supporting a plurality of thermocouples in a large vessel to obtain maximum heat conduction from the fluid with a minimum heat conduction from thermowell support tubes.

A further primary object of this invention is to provide a method for ensuring good contact between a thermocouple and a wall of a thermowell in which the thermocouple is mounted to provide a maximum of heat transfer from a fluid through the wall to the thermocouple for obtaining the temperature of the fluid passing through the bed.

A still further primary object of this invention is to provide a multiple thermowell assembly for a vessel containing a fixed bed of particulate solids for measuring various process fluid temperatures simultaneously in different precise locations in a horizontal section through the fixed bed in the vessel.

Yet another primary object of the invention is to provide a support for a plurality of thermowells in a large fluid processing vessel to obtain maximum heat conduction from the fluid with a minimum heat conduction from the thermowell support tubes.

Another primary object of this invention is to provide a contact device for ensuring good contact between the thermocouple and the wall of a thermowell in which the thermocouple is mounted for obtaining the temperature of a fluid passing through a bed at a precise location to provide a maximum of heat transfer from the fluid bed through the wall to the thermocouple.

Yet another object of this invention is to provide a multiple thermocouple assembly that is easy to operate, is of simple configuration, and is economical to construct and assemble.

Other objects and various advantages of the disclosed methods and at least one multiple thermocouple assembly will be apparent from the following detailed description, together with accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, at least one form or mechanism for carrying out, for practicing, or for being formed by the methods of the invention wherein like reference numerals have been employed to indicate similar parts in the several views in which:

FIG. 1 is a schematic horizontal section of a vessel processing a fluid throughout which temperature measurements are required to be taken;

FIG. 2 is a schematic sectional view taken at 2—2 on FIG. 1;

FIG. 3 is a schematic sectional view taken at 3—3 on FIG. 2;

FIG. 4 is a schematic enlarged view of a portion of FIG. 2 illustrating the thermocouples being fixedly mounted in spaced relationship from the support tube; and FIG. 5 is a schematic view of the bevelled plug mounting of an outer end of a thermocouple in its thermowell.

DESCRIPTION OF THE INVENTION

The invention disclosed herein, the scope of which being defined in the appended claims, is not limited in its application to the details of construction and arrangement of parts shown and described for carrying out or practicing the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for forming various portions of a multiple thermocouple assembly and at least one mechanism for practicing the methods and for being made by the disclosed methods or other methods.

Accordingly, a method for forming a multiple thermocouple assembly for a vessel containing a fixed bed of particulate solids such as hydrotreating catalyst in fixed bed reactors and other granular beds for measuring various fluid temperatures simultaneously in different defined locations in substantially a horizontal section through the fixed bed in a vessel comprises:

1. forming support means in opposite sidewalls of the vessel for attaching an elongated support member across the vessel,
2. fixedly connecting a plurality of thermowells to the elongated support member for substantially the length of the support,
3. fixedly connecting the plurality of thermowells to the elongated support member substantially equally spaced around the periphery of the member,
4. securing a bevelled plug along the length internally of each of the thermowells at different predetermined locations in each of the thermowells,
5. attaching the elongated support member with the thermowells fixed thereto to the support means in the opposite sidewalls of the vessel for extending across the vessel, and
6. inserting a thermocouple in each of the thermowells to wedge against the bevelled plug in each thermowell for positioning each thermocouple at its predetermined location in the horizontal section across the vessel for simultaneously measuring the fluid temperatures at the different various predetermined locations across the vessel.

A method for forming the support means for attaching the elongated support member across the vessel of the above method may comprise the method steps of:

1. forming a flanged nozzle in one sidewall of the vessel, and
2. forming a recessed support on a sidewall of the vessel directly opposite to the flanged nozzle.

A method for mounting the thermowells of the above assembly comprises:

1. fixedly connecting each thermowell to the elongated support member at spaced intervals along the length of each thermowell, and
2. fixedly connecting each thermowell in spaced relation from the elongated support member.

A method for mounting the bevelled plug of the above assembly comprises:

1. securing each bevelled and its respective thermowell with the bevelled surface facing outwardly away from the surface of the elongated support member.
2. inserting each thermocouple in its respective thermowell, and
3. wedging the end of each thermocouple against the thermowell wall farthest from the surface of the elongated support member for obtaining precise and accurate temperature measurements of the fluid at the various positions in the vessel.

A more detailed method for forming a multiple thermocouple assembly for a vessel containing a bed of particulate solids for measuring various fluid temperatures simultaneously in different locations in substantially a horizontal section through the fixed bed in the vessel comprises the steps of:

1. forming a flanged nozzle in a sidewall of the vessel,
2. forming a recessed support on a sidewall of the vessel directly opposite to the flanged nozzle,
3. fixedly connecting a plurality of thermowells to an elongated support member for substantially the length of the member and substantially equally spaced around the periphery of the member, or otherwise disposed for optimum structural strength of the resultant assembly as determined by its analysis as a beam.
4. fixedly connecting each thermowell in spaced relation away from the elongated support member,
5. securing a bevelled plug internally of each of the thermowells at different predetermined positions along the length in each of the thermowells,
6. inserting the elongated support member with the thermowells fixed thereto through the flanged nozzle to extend across the vessel to insert into the support recess, and
7. inserting a thermocouple in each of the thermowells to wedge against the bevelled plug in each thermowell for positioning each thermocouple at a predetermined position in the horizontal section across the vessel for measuring the fluid temperatures at the different various predetermined positions across the bed in the vessel.

Further, a method for supporting a plurality of thermocouples extending across the vessel for obtaining the maximum heat conduction from the fluid at precise and defined locations in the vessel with a minimum of heat conduction from the thermocouple supports comprises the steps of:

1. forming a support member from an enlongated round, heavy, walled tube,
2. forming a plurality of thermowells from elongated tubes having ends terminating the tubes at predetermined lengths,
3. inserting a bevelled plug in each of the thermowells at different predetermined locations,
4. securing each bevelled plug in its respective thermowell with the bevelled surface facing outwardly away from the cylindrical surface of the elongated support member,
5. inserting each thermocouple in its respective thermowell,
6. wedging the end of each thermocouple against the thermowell wall farthest from the surface of the elongated support member for obtaining precise and accurate temperature measurements of the fluid at the various positions in the vessel,
7. attaching the thermowells to the peripheral cylindrical surface of the round support tube and substantially equally spaced around the periphery of the cylindrical support tube,
8. fixedly connecting each thermo well to the elongated support tube at spaced intervals along the length of each elongated support tube,
9. fixedly connecting each thermowell in substantially equal spaced relation away from the cylindrical surface of the elongated support tube,
10. fixedly connecting each thermowell at substantially equal spaced intervals around the cylindrical surface of the support tube,
11. forming a support means in opposite sidewalls of a vessel of fluid on substantially a horizontal plane by a. forming a recessed support on one of the vessel sidewalls for receiving and supporting one end of the elongated cylindrical support, and b. forming a flanged nozzle in the vessel's other opposite sidewall for receiving and supporting the other end of the elongated cylindrical support tube, 12. attaching both ends of the elongated round support tube horizontally to the support means in the opposite sides of the vessel, and 13. inserting a thermocouple in each of the thermowells to wedge against the bevelled plug in each thermowell for positioning each thermocouple at a predetermined position in substantially the horizontal plane of the support tube across the vessel for measuring the fluid temperatures at the different various predetermined positions across the vessel.

DESCRIPTION OF THE APPARATUS

The drawings disclose one embodiment of the invention for carrying out or practicing the above-described methods for forming a multiple thermocouple assembly for a vessel for measuring various fluid temperatures simultaneously in different locations in a substantially horizontal section through the vessel as in a vessel containing a fixed bed of particulate solids such as a hydrotreating catalyst in fixed bed reactors or other granular beds and having the structural strength to withstand the vertical forces resulting from settlement of the beds and or dumping of the beds.

FIG. 1 discloses the multiple thermocouple support in a vessel. This FIGURE is a horizontal section of a vessel 10 throughout which temperature measurements are desired to be taken. An elongated round support, such as but not limited to, a cylindrical, heavy, walled tube 11 is mounted in a horizontal position or plane across the vessel. One end, the left end as illustrated in FIG. 1, of the elongated cylindrical tube 11 protrudes from a flanged nozzle 12 in one wall of the vessel to extend across the vessel to a recessed support 13 welded in a wall opposite to the first wall of the vessel. Elongated cylindrical tube 11 has a flange 14 fixedly connected, as by welding, to the tube's left end externally of the nozzle as seen in FIG. 1. The right end of the elongated support tube 11 is mounted in the recessed support 13. This support 13 is welded to the opposite wall of the vessel 10.

FIG. 2 illustrates details of thermowells 15 mounted on the elongated suport tube 11. Three thermowells 15a, 15b, and 15c are illustrated and preferred to be mounted equally spaced around this elongated support tube, particularly as shown in FIG. 3. One end, the left end, of each thermowell welded to the tube flange 14 and each thermowell, after assembly, extends parallel to and substantially for the length of the elongated support tube 11. Each thermowell is connected to the elongated support tube 11 with spacers 16, FIGS. 2, 3, and 4, mounted between the thermowell and the elongated support tube at spaced intervals along the entire length of an equal distance from the thermowell. FIG. 2 also illustrates the left end of the elongated support tube being welded to the tube flange 14 and the other end of the elongated support tube protruding into the recessed support 13 which is welded to the opposite wall of the vessel. A gasket 17 seals the flange 14 to the vessel around the nozzle 12. Thermocouples 18a, 18b, and 18c, FIG. 2, are mounted in the thermowells 15a, 15b, and 15c, respectively, and are described and illustrated hereinafter in greater detail in regard to FIG. 5.

FIG. 4, an enlarged view of the support tube 11, illustrates the thermowells 15a, 15b, and 15c with their respective thermocouples 18a, 18b, and 18c therein being fixedly mounted in spaced relationship from the support tube with the spacers 16.

FIG. 5, an enlarged detailed sectional view, illustrates a connection for a typical thermocouple 18a in its respective thermowell 15a at the precise location desired. At this precise location, the thermowell 15a is cut off and a bevelled plug 19 inserted in the opening and welded around the periphery thereof internally of the thermowell. Then an open-ended thermowell extension 20 is welded to the thermowell to extend the length of the thermowell to substantially the length of the elongated support tube 11. Thus, the bevelled plug is positioned at the precise or defined location that will locate the end of the thermocouple, when pressed against it, at its precise desired location for measuring the fluid temperature at that location. Thus each of the three thermocouples are positioned at their three different desired precise locations as determined by the mounting of the bevelled plugs.

For a typical thermowell mounting on a 1.316 inch diameter support tube 11 in a 12-foot inside diameter vessel 10, the first thermocouple 18a may be positioned to contact the outer wall of the 0.54-inch diameter thermowell 15a at a point two feet from the three inch inside diameter nozzle 12 in one wall of the vessel. The second thermocouple 18b may be positioned to contact the outer wall of its thermowell 15b at a point six feet from the nozzle. The third thermocouple 18c is mounted and held in position by its bevelled plug 19 to contact the outer wall of the thermowell at a point exactly 10 feet from the nozzle. The two-inch long welds or spacers 16 are spaced about six inches apart along the support tube 11 for supporting each thermowell about 1/16 inches from the support tube. Accordingly, each thermocouple is positioned at a predetermined location in substantially a horizontal section across the vessel for simultaneously measuring the fluid temperatures at the different various predetermined locations across the fixed bed in the vessel.

Obviously, other methods may be utilized for forming the various parts of a thermocouple assembly of either FIG. 4 or FIG. 5 than those illustrated above, depending upon the particular fluid passing through the bed which the temperature is desired to be measured.

Accordingly, it will be seen that while only a few methods for forming various parts of the thermocouple assembly and for operation or for use of the elements has been disclosed and only one embodiment of a thermocouple assembly has been disclosed, all of these methods and the embodiment will operate in a manner which meets each of the objects set forth hereinbefore. While only a few methods of the invention and at least one mechanism for carrying out the methods have been disclosed, it will be evident that various other methods and modifications are possible in the arrangement and construction of the disclosed method and thermocouple assembly without departing from the scope of the invention, and it is accordingly desired to comprehend within the purview of this invention such modifications as may be considered to fall within the scope of the appended claims.

We claim:

1. A method for assembling and forming a multiple thermocouple assembly for a vessel containing a fixed bed of particulate solids with a fluid being processed therethrough for measuring various fluid temperatures simultaneously in different defined locations in substantially a horizontal section through the fixed bed in the vessel, comprising the steps of,
- a. forming support means in opposite side walls of the vessel for attaching an elongated support tube across the vessel,
- b. fixedly connecting a plurality of thermowells to the elongated support tube for substantially the length of the tube,
- c. fixedly connecting the plurality of thermowells to the elongated support tube substantially equally spaced around the periphery of the tube to provide a high structural multiple thermocouple assembly as a beam,
- d. securing a bevelled plug along the length internally of each of the thermowells at different predetermined locations in each of the thermowells,
- e. attaching the elongated support tube with the thermowells fixed thereto to the support means in opposite side walls of the vessel for extending across the vessel, and
- f. inserting a thermocouple in each of the thermowells to wedge against the bevelled plug in each thermowell for positioning each thermocouple at a predetermined location in the horizontal section across the vessel for simultaneously measuring the fluid temperatures at the different various predetermined locations across the vessel.

2. A method as recited in claim 1 wherein the method of forming the support means comprises the steps of,
- a. forming a flanged nozzle in one side wall of the vessel,
- b. forming a recessed support on a side wall of the vessel directly opposite to the flanged nozzle, and
- c. forming the assembly of the thermowells and their support tubes in an array providing maximum structural strength as a beam.

3. A method as recited in claim 1 wherein the method of mounting the thermowells comprises the steps of,
- a. fixedly connecting each thermowell to the elongated support rod at a plurality of spaced intervals along the length of each thermowell, and
- b. fixedly connecting each thermowell in spaced relation from the elongated support tube at the plurality of spaced intervals.

4. A method as recited in claim 1 wherein the step of securing the bevelled plug comprises further,
- a. securing each bevelled plug in its respective thermowell with the bevelled surface facing outwardly away from the surface of the elongated support tube,
- b. inserting each thermocouple in its respective thermowell, and
- c. wedging the end of each thermocouple against the thermowell wall farthest from the surface of the elongated support tube for obtaining precise and accurate temperature measurements of the fluid at the various positions in the vessel.

5. A method for forming a multiple thermocouple assembly for a vessel containing a fixed bed of particulate solids with a fluid for being processed therethrough for measuring various fluid temperatures simultaneously in different locations in a horizontal section through the fixed bed in the vessel comprising the steps of,
- a. forming a flanged nozzle in a side wall of the vessel,
- b. forming a recessed support on a side wall of the vessel directly opposite to the flanged nozzle,
- c. fixedly connecting a plurality of thermowells to an elongated support tube at a plurality of spaced intervals along the length of each thermowell for substantially the length of the tube and substantially equally spaced around the periphery of the tube to provide a high structural strength multiple thermocouple assembly as a beam,
- d. fixedly connecting each thermowell in spaced relation away from the elongated support tube at the plurality of spaced intervals,
- e. securing a bevelled plug internally of each of the thermowells at different predetermined positions along the length in each of the thermowells,
- f. inserting the elongated support tube with the thermowells fixed thereto through the flanged nozzle to extend across the vessel to protrude into the support recess, and
- g. inserting a thermocouple in each of the thermowells to wedge against the bevelled plug in each thermowell for positioning each thermocouple at a predetermined position in the horizontal section across the vessel for measuring the fluid temperatures at the different various predetermined positions across the fixed bed in the vessel.

6. A multiple thermocouple assembly for a vessel used in processing a fluid over a fixed bed of particulate solids for measuring various fluid temperatures simultaneously in different, defined locations in a horizontal section through the fixed bed in the vessel comprising,
- a. an elongated tube support fastened horizontally in the vessel extending from one side wall to the opposite side wall in a predetermined horizontal section across the vessel,
- b. a plurality of thermowells fixedly secured with a fastening means to said elongated tube support along the length of the tube support and substantially equally spaced around the periphery of the tube support to provide a high structural strength multiple thermocouple assembly as a beam,
- c. a bevelled plug fixed in each thermowell at different predetermined locations across the tube support, and
- d. a thermocouple mounted in each of the thermowells wedged against the bevelled plug in its respective thermowell at said predetermined locations in said horizontal section across the vessel for simultaneously measuring the fluid temperatures at the different various predetermined locations across the fixed bed in the vessel.

7. A multiple thermocouple assembly as recited in claim 6 wherein,
- a. one end of the elongated tube is supported by a flanged nozzle in said one side wall,
- b. the other end of the elongated tube is supported by a recessed support on said side wall opposite to said one side wall, and
- c. the configuration of the support tube and the thermowells attached thereto is designed to provide maximum strength to the assembly acting as a beam.

8. A multiple thermocouple assembly as recited in claim 6 wherein,
- a. each of said thermowells is secured to said elongated tube support in spaced relation thereto for providing precise, accurate and true temperature measurements of said vessel fluid therearound.

9. A multiple thermocouple assembly as recited in claim 6 wherein,
   a. said fastening means secures each of said thermowells at a fixed distance from said elongated tube support at a plurality of spaced intervals along the length of each thermowell for providing precise, accurate and true temperature measurements of said vessel fluid therearound.

10. A method for supporting a plurality of thermocouples extending across a vessel used in processing a fluid over a fixed bed of particulate solids for obtaining the maximum heat conduction from the fluid at defined locations in the vessel with a minimum of heat conduction from the thermocouple support comprising the steps of,
   a. forming a support member from an elongated support tube,
   b. forming a plurality of thermowells from elongated tubes of various lengths along the elongated support tube,
   c. inserting a bevelled plug internally of each of the thermowells at different predetermined defined positions along the length in each of the thermowells,
   d. attaching the thermowells to the peripheral surface of the support tube and substantially equally spaced around the periphery of the support tube to provide a high structural strength multiple thermocouple assembly as a beam,
   e. forming support means in opposite side walls of the vessel of fluid on substantially a horizontal plane,
   f. attaching both ends of the elongated support tube horizontally to the support means in the opposite sides of the vessel, and
   g. inserting a thermocouple in each of the thermowells to wedge against the bevelled plug in each thermowell for positioning each thermocouple at a predetermined defined position in the horizontal plane of the support member across the vessel for measuring the fluid temperatures at different various predetermined defined positions across the vessel.

11. A method as recited in claim 10 wherein the method of forming the support means comprises,
   a. forming a recessed support on one of the vessel side walls for receiving and supporting one end of the elongated support tube,
   b. forming a flanged nozzle in the vessel opposite and other side wall for receiving and supporting the other end of the elongated support tube, and
   c. forming an assembly of support tubes and thermowells in a configuration to provide maximum strength to the assembly acting as a beam.

12. A method as recited in claim 10 wherein the method of attaching the thermowells to the peripheral surface of the support tube comprises,
   a. fixedly connecting each thermowell to the support tube at equally spaced intervals around the peripheral surface of the support tube,
   b. fixedly connecting each thermowell to the elongated support tube at spaced intervals along the length of the elongated support tube, and
   c. fixedly connecting each thermowell in spaced relation away from the peripheral surface of the elongated support tube.

13. A method as recited in claim 10 wherein the method for positioning each thermocouple in its respective thermorwell comprises,
   a. securing each bevelled plug in its respective thermowell with the bevelled surface facing outwardly away from the peripheral surface of the elongated support tube,
   b. inserting each thermocouple in its respective thermowell, and
   c. wedging the end of each thermocouple against the thermowell wall farthest from the surface of the elongated support tube for obtaining precise and accurate temperature measurements of the fluid at the various positions in the fixed bed in the vessel.

14. A method for forming the thermowell in the method recited in claim 10 comprising the steps of,
   a. forming each of the thermowells from elongated open-ended tubes of different precise defined lengths,
   b. securing a bevelled plug in the open end of each elongated tube, and
   c. fixing an extension to the end of each elongated tube to extend the length of each elongated tube to substantially the length of the thermowell support member.

15. A support for a plurality of thermocouples in thermowells extending across a vessel having a fixed bed of particulate solids therein with a fluid being processed therethrough for obtaining the maximum heat conduction from the fluid at precise locations in the vessel with a minimum of heat conduction from the thermowell support comprising,
   a. a horizontal, elongated tube attached at both ends to opposite side walls of a vessel,
   b. a plurality of thermowells fixed to the peripheral surface of the horizontal elongated support tube extending for substantially the length of the support tube,
   c. said thermowells being fixed to said support tube at spaced intervals therealong,
   d. said thermowells being fixed to said support tube at substantially equally spaced distances apart from each other around the periphery of the horizontal elongated support tube to provide a high structural strength multiple thermocouple assembly as a beam,
   e. said thermowells being fixed to said support tube along the length of the thermowells at substantially equal distances away from the peripheral surface of said support tube,
   f. plug means mounted in each of said thermowells at different defined predetermined positions along the length of the thermowells, and
   g. a thermocouple in each of said thermowells positioned against its respective plug for measuring the fluid temperatures at different predetermined positions across the fixed bed in the vessel.

16. A support as recited in claim 15 wherein,
   a. said plug means comprises at least one bevelled plug having a bevelled surface facing outwardly away from said elongated support tube peripheral surface at its predetermined defined position in the vessel, and
   b. one of said thermocouples being wedged against said one bevelled plug for positioning said one thermocouple against its thermowell wall farthest from said support tube peripheral surface for obtaining a precise and accurate temperature measurement of the fluid at said predetermined position in the vessel.

17. A support as recited in claim 15 wherein, a. said plug means comprises a bevelled plug in each of said thermowells having a bevelled surface facing outwardly away from the peripheral surface of said elongated support tube, and
b. each of said thermocouples being wedged against its respective bevelled plug for positioning each thermocouple against its respective thermowell wall farthest from said support tube peripheral surface for obtaining precise and accurate temperature measurements of the fluid at the various positions in the vessel.

* * * * *